United States Patent Office

3,160,652
Patented Dec. 8, 1964

3,160,652
PREPARATION OF MONOALKOXY
DECABORANES
David J. Mann, Livingston, and Murray S. Cohen, Dover, N.J., assignors, by mesne assignments, to Thiokol Chemical Corporation, a corporation of Delaware
No Drawing. Filed Apr. 2, 1957, Ser. No. 650,230
2 Claims. (Cl. 260—462)

This invention relates to a method for the preparation of alkoxy decaboranes, particularly normally liquid alkoxy decaboranes of the formula $B_{10}H_{13}OR$ wherein R is an alkyl radical containing from 1 to 4 carbon atoms. The alkoxy decaboranes produced in accordance with the present invention are useful as fuels when burned with air.

Alkoxy decaboranes, particularly methoxy decaborane, have been prepared heretofore by the reaction of monoiododecaborane and a suitable sodium alkoxide, such as sodium methoxide. The yield from this reaction is low and the required monoiododecaborane intermediate is prepared by the halogenation of decaborane. It is an object of this invention to prepare alkoxy decaboranes by a new method, particularly one in which a halogenation procedure need not be resorted to. This is accomplished by reacting a suitable alkali metal alkoxide and decaborane at a temperature of from 25° C. to 100° C. while the reactants are in admixture with a lower dialkyl ether. This procedure results in the production of a reaction mixture probably containing the 1:1 molar addition product of the alkali metal alkoxide and decaborane. The reaction mixture thus formed is thereafter reacted with a suitable dialkyl sulfate at a temperature within the range from 25° C. to 100° C. The alkoxy decaborane thus produced can thereafter be recovered from the reaction mixture by conventional means such as distillation and solvent extraction.

The following examples illustrate in detail various procedures which fall within the scope of this invention.

*Example I*

Lithium methoxide was first prepared in the conventional manner by reacting 1.2 grams (0.174 mole) of lithium metal and an excess of methanol and thereafter removing the excess methanol under a vacuum. The lithium methoxide thus prepared was then suspended in 100 ml. of dry diethyl ether. To the suspension containing the lithium methoxide there was added in one portion a solution of 21.2 grams (0.174 mole) of decaborane in 100 ml. of dry diethyl ether. A deep yellow solution formed and this solution was refluxed for approximately 16 hours at atmospheric pressure. This procedure resulted in the production of a reaction mixture which probably contained the 1:1 molar addition product of lithium methoxide and decaborane.

22.1 grams (0.174 mole) of dimethyl sulfate was then added gradually to the reaction mixture over a period of approximately 0.1 hour while the temperature of the reaction mixture was maintained at approximately 10° C. A slow evolution of methane resulted at ether reflux which was monitored by passing through a wet-test gas meter. After 24 hours, 4.5 liters of methane were measured. The diethyl ether solvent was then removed from the reaction mixture under a vacuum, leaving a solid residue which was extracted at room temperature with approximately 100 ml. of a mixture containing approximately 90 percent by weight of pentane and 10 percent by weight of methylene chloride. The extract was subjected to precise distillation, and a fraction weighing 5.0 grams was collected at a temperature within the range from 70° C. to 90° C. at an absolute pressure of 3 mm. of mercury. An infrared spectrum of this sample showed that it contained a mixture of decaborane and monomethoxy decaborane. The decaborane can be separated from the monomethoxy decaborane by vacuum distillation at an absolute pressure of 0.2 mm. of mercury. Such a procedure results in the removal of the decaborane, leaving normally a liquid mixture of monomethoxy decaborane and monomethyl decaborane remaining in the reaction vessel. These two materials can be separated from each other by precise fractionation at reduced pressure.

Various modifications can be made in the procedures of the specific example to provide other embodiments which fall within the scope of this invention. Thus, in place of the lithium methoxide, there can be utilized equimolar amounts of other alkali metal alkoxides, such as sodium methoxide, sodium ethoxide, lithium ethoxide, lithium n-propoxide and the like. The molar ratio of alkali metal alkoxide to decaborane utilized will generally be within the range from 0.5 to 2, but preferably equimolar quantities of the decaborane and the alkali metal alkoxide are employed. In reacting the decaborane and the alkali metal alkoxide, the reactants are in admixture with a dialkyl ether containing a total from 2 to 8 carbon atoms. In the examples, diethyl ether was used, but in its place there can be employed dimethyl ether, di-n-propyl ether, di-isopropyl ether, di-n-butyl ether, di-sec-butyl ether, di-isobutyl ether, methylpropyl ether and the like. Mixtures of the ethers can also be used, and the reaction mixture will generally contain from approximately 20 percent by weight to 98 percent by weight of the dialkyl ether or mixture of dialkyl ethers. In reacting the decaborane and alkali metal alkoxide, the reaction will generally be carried out for a period of from 1 to 50 hours.

After the reaction between the decaborane and the alkali metal alkoxide has been completed, the reaction with the dialkyl sulfate is then performed. In the examples, dimethyl sulfate was utilized, but in its place there can be substituted an equivalent amount of other dialkyl sulfates containing from 1 to 4 carbon atoms in each alkyl radical, for example, diethyl sulfate, di-n-propyl sulfate, di-isopropyl sulfate, di-n-butyl sulfate, di-sec-butyl sulfate, di-isobutyl sulfate, and the like. Generally from 0.5 to 2 moles of dialkyl sulfate per mole of decaborane originally charged is introduced into the reaction mixture, and preferably one mole of the dialkyl sulfate per mole of decaborane is used. In reacting the dialkyl sulfate, the temperature will generally be within the range from 25° C. to 100° C. and the reaction will be carried out for a period of from 1 to 50 hours. Here again, the reaction in which the dialkyl sulfate is used is carried out while the reaction mixture contains from approximately 20 percent by weight to 98 percent by weight of the dialkyl ether containing a total of from 2 to 8 carbon atoms. The alkyl radical of the alkali metal alkoxide and the alkyl radicals of the dialkyl sulfate should all be the same if a mixture of products is to be avoided. Thus, it will be noted that in the specific examples the alkyl radicals of the lithium alkoxide and the dialkyl sulfate were all methyl groups. Where it is desired to prepare monoethyldecaborane, for example, an alkali metal ethoxide and diethyl sulfate should be used.

The compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of the present invention are particularly suited for use as fuels in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore the operating combustion pressure in the combustor can vary from approximately 90 to 300 pounds per square inch absolute at static sea level conditions to about 5 to 15 pounds per square inch absolute at the etremely high altitudes of approximately 70,000 feet. The products of the present invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than the composition produced by the present invention. Excess air is introduced into the combustion for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the monomethoxy decaborane, for example, this local fuel to air ratio by weight is approximately 0.094. For the higher energy fuels of the present invention, because of their higher heating values in comparison with the simple hydrocarbons, the overall fuel-air ratio by weight across the combustor will be approximately 0.008 to 0.015 if the resultant gas temperature is to remain within the presently established tolerable temperature limits. Thus, when used as the fuel supplied to the combustor of an aircraft gas turbine engine, the products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at takeoff and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products of the present invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of the product of the present invention and hydrocarbon fuel present in the mixture, and consistent with the air dilution required to maintain the gas temperatures of these mixtures within accepted turbine operating temperatures.

Because of their high chemical reactivity and heating values, the products of the present invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products of the present invention are such that good combustion performance can be attained even at the marginal operation conditions encountered at high altitudes, assuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of this invention eliminates the need of flame-holding devices within the combustion zone of the afterburner. When employed in an afterburner, the fuels produced in accordance with the present invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products produced in accordance with the present invention will improve the combustion process of the ramjet in much the same manner as that described for the afterburner because of their improved chemical reactivity over that of simple hydrocarbon fuels. When employed in a ramjet the fuels produced in accordance with the present invention will be simply substituted for hydrocarbon fuels and used in the established manner.

It is claimed:

1. A method for the preparation of a monoalkoxy decaborane which comprises reacting one mole of decaborane and from 0.5 to 2 moles of a compound of the formula MOR at a temperature from 25° C. to 100° C. for a period of time of from 1 to 50 hours while the reaction mixture contains from 20 to 95 weight percent of a dialkyl ether containing a total of from 2 to 8 carbon atoms, admixing the reaction mixture thus formed with from 0.5 to 2 moles of a compound of the formula $R_2SO_4$ and reacting the resulting reaction mixture at a temperature of from 25° C. to 100° C. for a period of from 1 to 50 hours, M being an alkali metal and R being an alkyl radical containing from 1 to 4 carbon atoms.

2. A method for the preparation of monomethoxy decaborane which comprises reacting one mole of decaborane and approximately one mole of lithium methylate at a temperature of from 25° C. to 100° C. for a period of from 1 to 50 hours while the reaction mixture contains from 20 to 98 weight percent of diethyl ether, admixing the reaction mixture thus formed with approximately one mole of dimethyl sulfate and reacting the resultant reaction mixture at a temperature of from 25° C. to 100° C. for a period of from 1 to 50 hours.

References Cited in the file of this patent

UNITED STATES PATENTS 2,993,751      Edwards et al. _____ July 25, 1961